(12) United States Patent
Kun et al.

(10) Patent No.: US 8,610,672 B2
(45) Date of Patent: Dec. 17, 2013

(54) DEVICE AND METHOD FOR STROKE BASED GRAPHIC INPUT

(75) Inventors: Yu Kun, Beijing (CN); Zou Yan Ming, Beijing (CN); Wang Kong Qiao, Beijing (CN)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 12/100,596

(22) Filed: Apr. 10, 2008

(65) Prior Publication Data

US 2009/0256808 A1     Oct. 15, 2009

(51) Int. Cl.
*G06F 3/041* (2006.01)
*G06F 3/033* (2013.01)

(52) U.S. Cl.
USPC .......................... 345/173; 345/179; 382/189

(58) Field of Classification Search
USPC ................. 345/173–179; 382/186, 187, 189; 178/18.01–18.11, 19.01–19.07
See application file for complete search history.

(56) References Cited

U.S. PATENT DOCUMENTS

| | | | | |
|---|---|---|---|---|
| 7,502,017 B1 * | 3/2009 | Ratzlaff et al. | ............... | 345/173 |
| 7,562,314 B2 * | 7/2009 | Blount et al. | ................ | 715/863 |
| 7,564,995 B1 * | 7/2009 | Yaeger et al. | ................ | 382/119 |
| 2003/0038788 A1 * | 2/2003 | Demartines et al. | ......... | 345/173 |
| 2004/0223647 A1 * | 11/2004 | Blount et al. | ................ | 382/189 |
| 2009/0161958 A1 * | 6/2009 | Markiewicz et al. | ........ | 382/186 |
| 2009/0304281 A1 * | 12/2009 | Yipu | ............................ | 382/187 |

OTHER PUBLICATIONS

Chinese Office Action dated Oct. 21, 2010.
Office Action for Chinese Application No. 200910129949.0 dated Aug. 30, 2011.

* cited by examiner

*Primary Examiner* — Hong Zhou
(74) *Attorney, Agent, or Firm* — Alston & Bird LLP (57) ABSTRACT

A user interface includes a touch screen configured to receive stroke input(s). The user interface is arranged to display a graphical trace of the received stroke input on the touch screen and to determine whether a criterion is fulfilled and if so remove at least a portion of the graphical trace, wherein the criterion is based on the received stroke input.

12 Claims, 4 Drawing Sheets

DEVICE AND METHOD FOR STROKE BASED GRAPHIC INPUT

FIELD

The disclosed embodiments relate to a device and a method for graphic input and in particular to a device and a method for fading of graphic stroke based input.

BACKGROUND

It is commonly known to use stroke based input for text input or other graphic input in a wide variety of devices such as mobile phones, laptops with graphical user interfaces and Personal Digital Assistants (PDAs).

Stroke based input is commonly used for hand writing recognition (HWR) and the text input in such systems is effected by the user drawing the character using either a stylus (or a pen) or a finger on either a touch display or a dedicated touch input area. The stroke is then processed and a matching character is input to the system. Such input is sometimes referred to as pen input. One example of such a system can be found in the Sony Ericsson P900™.

In some systems, especially such systems utilizing touch displays, a graphic trace of the pen input is displayed. This helps the user see what he has input and helps the user to for example place diacritics in the correct position. The traces are either removed by an explicit command from the user or automatically after a timeout period(s) has lapsed. Requiring a special clear command adds one extra command for every character to be input which is tedious work, especially for long texts, and takes time. Using a time out may cause a trace to disappear before the user has had time to complete it or supplement it causing an erroneous recognition which requires a user to correct or repeatedly input such characters.

US Patent Publication No. US 2003038788 discloses a handheld device such as a personal digital assistant (PDA) or the like, a handwritten input user interface (HIUI), a method of interfacing handwritten text and a program product therefore. A lower portion of a touch enabled display is designated as a handwriting input area. Action icons are disposed at a right side of the handwriting user interface 102. Recognized text is displayed on the screen in a text display area located between a file management tool bar and the handwritten input area. A scroll bar is disposed at the right side of the display. As text is continuously entered each individual word may be recognized, and inserted into the end of the text stream. A word separator may demarcate or bracket individual words in a continuous input stream. A secondary list of potential recognition candidates may be available for display in a box and offered for substitution for or in lieu of the recognized word. Handwritten text may be continuously entered and displayed in the handwriting input area as digital ink, the input point staying approximately fixed with the ink display automatically scrolling. The input area behaves as a "treadmill" or "ticker tape" that is moving from right to left, thereby giving the illusion of a continuous writing space. The speed of the "treadmill" automatically adapts to writing speed. The device may include a communications function and, in particular the device may include an antenna for wireless communication. Individual function switches, buttons and other controls are disposed about the device.

As the input pen strokes are moved as on a ticker tape it can be confusing for a user to decide where to input the next character in that a specific starting point is not given and perhaps the user will become doubtful that there will be enough room if the user wants to input a large character or a long word. Also as the ticker tape moves the characters the user will have to adapt to this movement making the input less intuitive and some relearning is necessary which always requires a mental effort.

SUMMARY

On this background, it would be advantageous to provide a device and a method that overcomes or at least reduces the drawbacks indicated above. In one embodiment, a user interface is provided that is adapted to display a graphical trace and remove a portion of the graphical trace as a criterion is reached.

The disclosed embodiments provide a user interface comprising a touch screen adapted to receive stroke input, wherein said user interface is arranged to display a graphical trace of said received stroke input on said touch screen and to determine whether a criterion is fulfilled and if so remove at least a portion of said graphical trace, wherein said criterion is based on said received stroke input.

By removing a portion of the graphical trace, a user is provided with an overview of what has been input and there through also a potential possibility of correcting or supplementing previous input. By basing a criterion on the received stroke input a dynamic removal can be achieved which leads to an intuitive and easy to use and learn user interface for touch input in that the user maintains control over the input, an overview and is always provided with space for further input.

The criterion is based on or calculated from the stroke input and in particular based on a characteristic of the stroke input and not merely on the time of input. A criterion based simply on the time of input such as a timeout session is not based on a characteristic of a stroke input as it is only dependant on time, being a universal feature and not as such a characteristic of the stroke input.

In one embodiment the user interface is arranged to remove at most a portion of said graphical trace in a first step and in a second step remove said graphical trace completely.

In one embodiment the user interface is arranged to remove a portion of said graphical trace in at least a first step and in a subsequent step remove said graphical trace completely.

Thus, firstly the trace is removed only partially indicating to a user that the trace is about to be removed completely and secondly, unless a user action is taken to the contrary, the trace is removed completely. This has the advantage of giving the user a premonition that the trace is about to be removed and allows the user to maintain an overview of the input and allows for increased control of the input in that the premonition is given.

In one embodiment the criterion is spatial. In one embodiment the criterion is based upon a parameter taken from the group comprising total area of said graphical trace, total area of a body encompassing said graphical trace, distance from said graphical trace to an edge of said touch screen and an accumulated length of said graphical trace. By using a spatial criterion the screen is always updated by removing graphical traces so that there is always room for further stroke input.

In one embodiment the criterion is temporal. In one embodiment the criterion is based on an input speed or frequency or wherein said criterion is based on the total number of graphical traces being displayed. By basing the criterion on the input speed or frequency the removal of graphical traces is adapted to the speed of which new strokes are input, thus adapting the user interface to different user needs. By basing the criterion on the number of strokes received a simple and actual time independent arrangement of keeping a text input area clear for new input.

In one embodiment the criterion is contextual. In one embodiment the criterion is based on a number of available candidates for a received stroke input. By basing the criterion on contextual factors account can be taken of whether other possibilities for editing exist thus allowing a user an easier and faster way of supplementing previously input strokes.

In one embodiment the portion of said graphical trace corresponds to a group of strokes. By grouping the strokes a character or a collection of characters, i.e. a word, can be removed as one unit making the method easy to overview as no incomplete characters or words are left on the screen view.

In one embodiment the user interface is further arranged to gradually remove said portion of said graphical trace to be removed before removing said portion completely. By gradually removing or fading the portion to be removed before actually removing it completely a user receives a pre-warning that the portion is to be removed and is thus given an opportunity to supplement or correct the stroke(s) corresponding to the graphical trace(s) about to be removed.

In one embodiment the faded display is achieved by displaying said portion to be removed with a lower intensity, as a dotted or segmented line, in a different color or as being shaded.

In one embodiment the graphical trace is maintained stationary before being removed.

The aspects of the disclosed embodiments are also directed to providing a user interface comprising a stroke input receiving touchpad, a stroke input related trace displaying screen and a stroke based criterion checking controller for causing or adapted to cause said screen to display said trace while said criterion is not fulfilled and for causing or adapted to cause said display to first display at least a portion of said trace and thereafter not displaying said trace when said criterion is fulfilled.

The aspects of the disclosed embodiments are also directed to providing a user interface comprising a touchpad for receiving stroke based input, a display and a controller, wherein said touchpad is operatively connected to said controller wherein said controller comprises at least one stroke input based criterion checker having a first and a second state and said controller is operatively connected to said display, wherein said display is arranged to display a trace relating to said received stroke input when said criterion checker is in said first state and to firstly remove a portion of said trace and secondly remove said trace completely when said criterion checker is in said second state.

It should be noted that in the user interfaces above the touchpad and the screen can be incorporated into a touchscreen.

It should also be noted that the user interfaces above have the same advantages and alternatives.

The aspects of the disclosed embodiments are also directed to providing a device comprising a user interface according to above.

In one embodiment the device is a mobile communications terminal.

In one embodiment the device is a laptop computer.

In one embodiment the device is a drawing pad.

In one embodiment the device is a personal digital assistant.

The aspects of the disclosed embodiments are also directed to providing an apparatus comprising touch screen means for receiving stroke input and for displaying a graphical trace of said received stroke input, and comprising means for basing a criterion on said received stroke input and processing means for determining whether a criterion is fulfilled and if so remove at least a portion of said graphical trace.

The aspects of the disclosed embodiments are also directed to providing a method for displaying graphical traces of received stroke input on a touch screen, said method comprising receiving stroke input basing a criterion on said received stroke input, displaying a graphical trace of said stroke input determine whether a criterion is fulfilled and if so removing at least a portion of said graphical trace.

This method and the embodiments below have the same advantages as stated above.

In one embodiment the method further comprises calculating an accumulated length of said graphical trace and said determining whether a criterion is fulfilled includes determining whether said accumulated length is above a threshold value.

In one embodiment the method further comprises calculating an area of said graphical trace and said determining whether a criterion is fulfilled includes determining whether said area is above a threshold value.

In one embodiment the method further comprises calculating an input frequency or input speed of said stroke input and said determining whether a criterion is fulfilled includes setting a time period accordingly and determining whether a portion of said graphical trace has been displayed for longer than said calculated time period.

In one embodiment the method further comprises calculating the number of received input strokes and said determining whether a criterion is fulfilled includes determining whether said number of received input strokes is larger than a threshold value.

In one embodiment the method further comprises determining whether a group of strokes can be further supplemented and determining whether a criterion is fulfilled accordingly.

The aspects of the disclosed embodiments are also directed to providing a computer readable medium including at least computer program code for controlling a user interface comprising touch screen, said computer readable medium comprising software code for receiving stroke input, software code for displaying a graphical trace of said stroke input, software code for basing a criterion on said received stroke input and software code for determining whether a criterion is fulfilled and if so removing at least a portion of said displayed graphical trace.

This computer readable medium and the embodiments below have the same advantages as stated above.

In one embodiment the computer readable medium further comprises software code for fading or gradually removing said portion of said graphical trace before removing it.

The aspects of the disclosed embodiments are also directed to providing a device incorporating and implementing or adapted to incorporate and to implement a computer readable medium including computer readable program code means configured to calculate an area of said graphical trace and said determining whether a criterion is fulfilled includes determining whether said area is above a threshold value.

Further aspects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the device, the method and the software product according to the teachings of this application in the form of a cellular/mobile phone will be described by the embodiments. It should be noted that although only an exemplary mobile phone is described herein with reference to the aspects of the disclosed embodiments, the teachings of this application can also be used in any electronic device such as in portable electronic devices such as laptops, PDAs, mobile communication terminals, drawing pads, electronic books and notepads and other electronic devices accepting pen-based user input.

Figure 1:
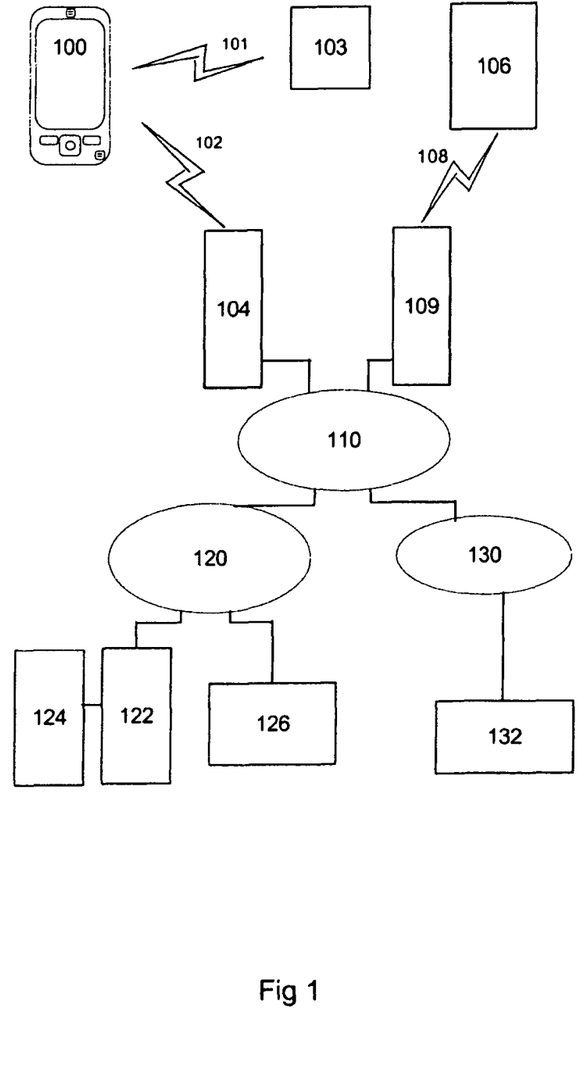
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
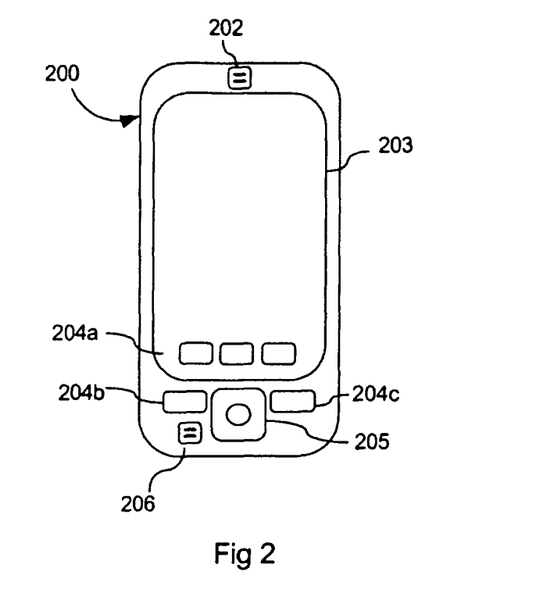
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 206, a touch display 203 and a set of keys 204 which may include virtual keys 204a, soft keys 204b, 204c and a joystick 205 or other type of navigational input device.

Figure 3:
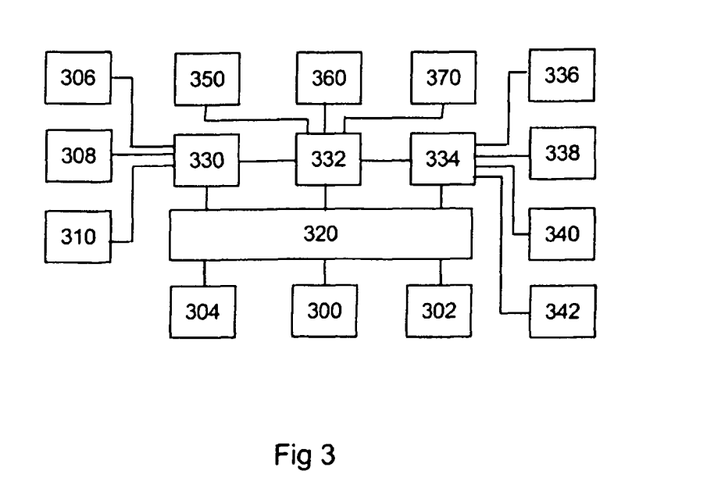
FIG. 3 is a block diagram illustrating the general architecture of a device of FIG. 1 in accordance with the present application, FIGS. 4a, b, c and d are screen views of a device according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a hand writing recognition (HWR) application 360, as well as various other applications 370, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc. It should be noted that two or more of the applications listed above may be executed as the same application.

The MMI 334 also includes one or more hardware controllers, which together with the MMI drivers cooperate with the first display 336/203, and the keypad 338/204 as well as various other I/O devices such as microphone, speaker, vibrator, ringtone generator, LED indicator, etc. As is commonly known, the user may operate the mobile terminal through the man-machine interface thus formed.

The software can also include various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), laptops, drawing pads, personal organizers or any other device designed for accepting touch or pen-based user input.

Figures 4A, 4B:
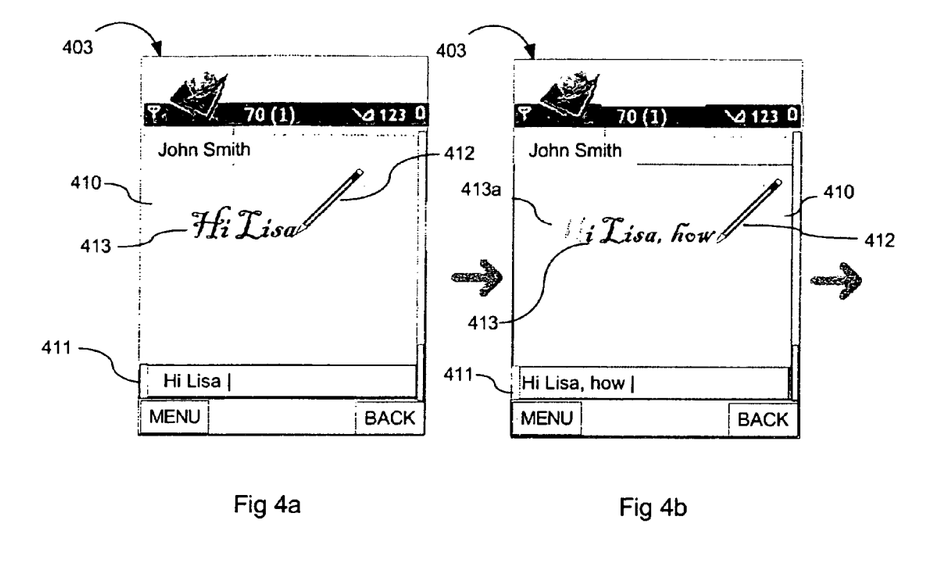

FIG. 4a shows a screen image 403 of a touch screen 203 of a device according to the teachings herein. In the top part of the screen view 403 a field for specifying a recipient is arranged. In the middle part of the screen view 403 a text input field 410 is arranged for inputting a text 411 to be used by a message application through an editor application 350 utilizing a hand writing recognition application 360. As a user inputs strokes using a stylus or a finger 412 in the text input field a graphical trace 413 of the pen stroke is displayed. This enables the user to position characters and/or parts of a character in the proper position making it easier for the user to input the characters and/or words and also for the HWR application 360 to recognize the input words/characters. As a stroke is input the HWR application recognizes the corresponding character and displays it as part of the input text 411. In this embodiment this text 411 is displayed in a text display portion arranged in the lower part of the touch screen 403. In this embodiment graphical traces 413 of more than one character is shown at the same time.

Parallel to or as part of the execution of the text editor application a criterion for displaying the graphical trace is checked. If the criterion is fulfilled the trace 413 is shown and if not it is removed.

The removal can be effected in two steps. In a first step the trace is only removed partially to give the user a premonition that it is about to be removed and providing the user with an opportunity to use the trace for further (supplementary) input before it is removed. In the second step the trace is removed completely and any further stroke input in the same area as the removed trace previously occupied will no longer be regarded as supplementary input, but input relating to a new character or word.

The criterion is based on or calculated from the stroke input and in particular based on a characteristic of the stroke input and not merely on the time of input. A criterion based simply on the time of input such as a timeout session is not based on a characteristic of a stroke input as it is only dependant on time, being a universal feature and not as such a characteristic of the stroke input.

The criterion can be spatial, contextual or temporal.

One spatial criterion can be accumulated length of graphical trace. Using this criterion the graphical trace is faded in the earliest portion 413a as the accumulated length of the graphical trace 413 reaches a certain threshold value. This value depends on factors such as screen size, language used, hand writing application and pixel size. To illustrate, the Latin letter 'N' would have an accumulated length of 39 pixels and the Latin letter 'M' would have an accumulated length of 42 pixels. The graphical traces for a series of 'M's would thus start to be removed sooner than graphical traces for a series of an equal number of 'N's.

A threshold value as above (and below) is to be taken to mean a value against which something measured or calculated is compared to and depending on whether the compared (or measured) value is higher (or lower depending on the application) than the threshold value a function or event is triggered. Said event can be a transition to a new state. The threshold value can normally be either fixed in the application, provided by a user or be determined according to some other/external/application dependant criteria.

Another spatial criterion can be determined based upon locality of the stroke input. If a stroke input 412 is received on or close to a graphical trace 413, that trace 413 is removed.

Another criterion is to remove graphical traces 413 as the text input area 411 is filling up with graphical traces. This can be determined based on the distance from the body 414 of displayed graphical traces 413 to the edge of the text input area 410a, see FIG. 4c. Or based upon the area of the body 414 possibly related to the area of the text area 410. These relationships can be user-selectable. The graphical trace to be removed can be either the trace that is closest to the edge or taking up most area, or the one corresponding to the earliest input stroke. It could also be possible to combine this criterion with any of the other criteria.

A contextual criterion is to remove a trace after a shorter time period if the character or word is complete, i.e. there are no other candidates that the trace can be supplemented into. For example the Latin character 'N' would receive a longer timeout period before being removed than the character 'M' as the character 'N' could still be supplemented into a different character, i.e. 'M'. In one embodiment the time period is equal to 0 or in other words, the trace is removed as the character is recognized as being the only possible candidate.

In one embodiment the time period is replaced by another criterion. For example, the character 'N' would only partially be accounted for when calculating the accumulated trace length thus leaving it visible for a longer time before being removed.

It should be noted that the contextual criterion can also be applied on a word or phrase level.

A temporal criterion can be number of strokes made so that as a user inputs a number of strokes the earliest strokes are faded and removed one by one with a lag of a predetermined number of strokes, for example 10. The suitable number of strokes depends on factors such as the size of the screen, the writing script used and the hand writing recognition application. Input of Chinese characters would benefit from a greater lag as many characters consists of many strokes, for example 10, where s a character by character Latin based HWR application would benefit from a smaller number, for example 3 or 4, which would keep the input are clean whilst a word-by-word Latin-based HWR application would benefit from a larger number displaying a whole word or more than one word, for example 15 or 20.

The number of strokes could be user-selectable.

Another temporal criterion could be to measure the input pace or frequency and set a timeout value accordingly generating a short timeout value for a user who inputs characters quickly and a longer timeout value for a slower user. The timeout value can be set dynamically so that it can change according to changes in the input speed or frequency.

Another criterion could be to use a first in first out principle in that the oldest stroke is removed first. An alternative to this is to use a contextual criterion in that stroke combinations that can be further supplemented are removed after stroke combinations that cannot be supplemented.

A combination of the criteria above can also be used.

The criterion used could be user-selectable.

Figure 4C:
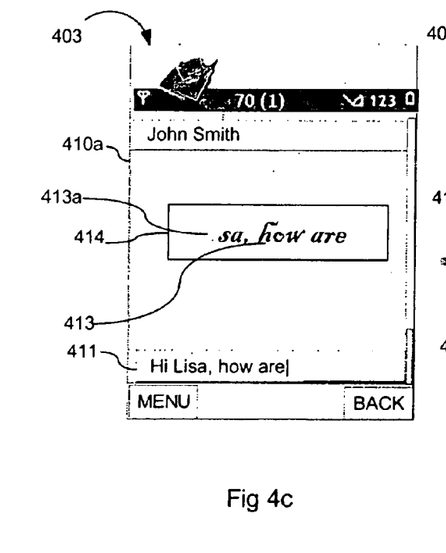

In one embodiment the removing of the graphical trace 413 is preceded by a gradual or partial removal or fading of the trace as can be seen in FIG. 4b where the upper portion 413a of the last graphical trace 413 is shown as faded. The fading can be effected in a number of ways including fading, shading, decreasing intensity, changing color, replacing with a dotted or segmented line possibly increasing the distance between the dots or line segments and/or decreasing the size of dots or line segments as the fading progresses. As a user continues to write more and more graphical traces fade away and are thusly removed as can be seen in FIG. 4c.

It should be noted that the graphical traces are maintained static before being removed so that a user knows where the strokes were made and where to add supplemental strokes without having to look or scroll for previously input strokes. This makes it highly intuitive for a user to input, supplement or correct strokes as the previously input strokes are logically placed where they were made.

Figure 4D:
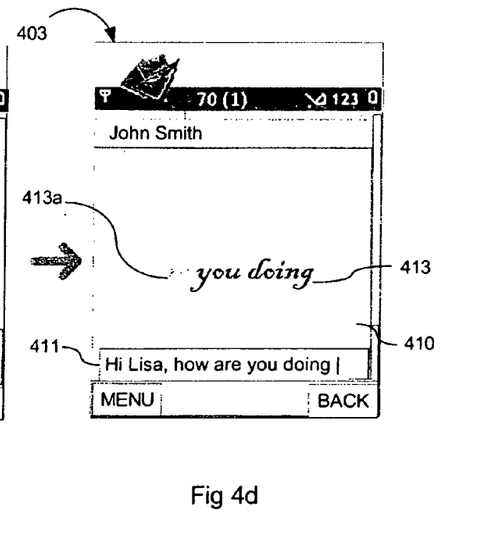

As the graphical trace fades and are removed 413 more space is left for the user to continue writing on, see FIG. 4d where a user has input characters over the whole screen and continues inputting in the top left corner as if writing on a new page. This makes stroke input very intuitive and easy to use and learn while still offering control and overview of earlier inputs.

It should be noted that the fading is not mandatory and can be opted out. The fading offers the user a warning that part of the trace is about to be removed giving the user time to supplement the input should he so want to before it is removed.

The graphical traces can also be grouped according to their corresponding matched character as recognized by the hand writing recognition application and be removed as a group instead of individually.

Figure 5:
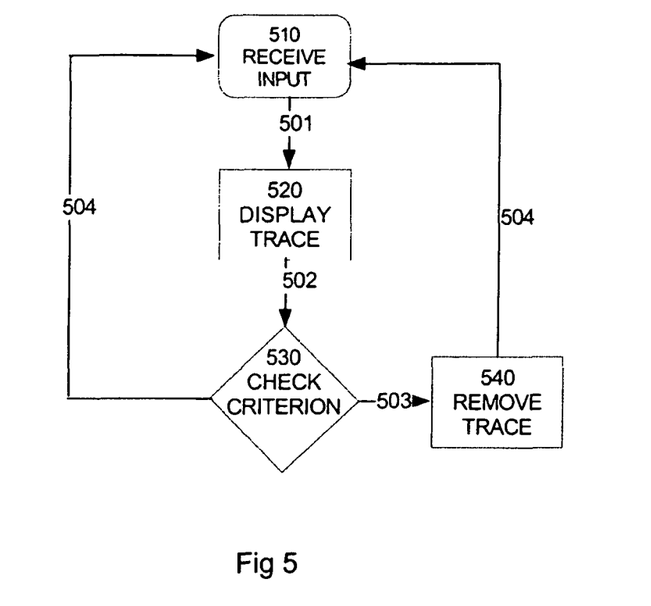
FIG. 5 is a flow chart describing a method according to an embodiment.

FIG. 5 shows a flow chart of a method according to the teachings herein. In the initial step 510 a stroke input is received and processed by the hand writing recognition application. In the subsequent step (that can be performed in parallel with the HWR) a graphical trace is displayed 520. Subsequently or simultaneously a criterion is checked in step 530. Should the criterion be fulfilled a graphical trace is removed in step 540. Subsequently the method returns to step 510 for receiving further strokes.

In one embodiment the criterion to be used is dependant on the speed of input and if this speed is determined to be above a certain value, that depends on the language, the hardware and software of a device and other features, the traces are removed as soon as a character is recognized giving a fast user ample space for new character input. In one embodiment the tracing can be removed after each stroke even.

In another embodiment the user interface can detect whether the speed of input is higher than the possible recognition speed of the hand writing recognition the hand writing recognition is temporarily switched of and the stroke input is saved as it is input, i.e. in graphical form and not as coded characters. This can be used to allow a user to make very quick notes for later retrieval for editing. In this latter embodiment the traces can be displayed as part of the text 411 to signal to a user that the strokes are not being recognized. This possibility can also be used if a stroke combination is not recognized but the user keeps on providing further stroke input.

The teaching of the present application has numerous advantages. Different embodiments or implementations may yield one or more of the following advantages. It should be noted that this is not an exhaustive list and there may be other advantages which are not described herein. One advantage of the teaching of this application is that the screen 403 is always kept clean providing ample space for further stroke input even during continuous input without requiring additional commands or risking loosing overview of the input.

Another advantage of the teaching of the present application is that the user is always kept aware of the recent pen strokes.

Another advantage of the teaching of the present application is that the user is provided with a feeling of being in control of the input.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

The term comprising as used in the claims does not exclude other elements or steps. The term "a" or "an" as used in the claims does not exclude a plurality. A unit or other means may fulfill the functions of several units or means recited in the claims.

The invention claimed is:

1. A user interface comprising:
a touch screen adapted to receive stroke input,
wherein said user interface is configured to: a) display a graphical trace of said received stroke input on a display;
b) in an instance in which an input speed of the received stroke input is below a threshold value, recognize the received stroke input as coded characters and cause at least a portion of the graphical trace to be removed from the display; and
c) in an instance in which the input speed of said received stroke input is above the threshold value, cause the graphical trace to be stored in a memory of the user interface in a graphical form.

2. A user interface according to claim 1, wherein said user interface is configured to remove at most a portion of said graphical trace in a first step and in a second step remove said graphical trace completely.

3. A user interface according to claim 1 wherein said portion of said graphical trace corresponds to a group of strokes.

4. A user interface according to claim 1 further configured to gradually remove said portion of said graphical trace to be removed before removing said portion completely.

5. A user interface according to claim 4, wherein said faded display is achieved by displaying said portion to be removed with a lower intensity, as a dotted or segmented line, in a different color or as being shaded.

6. A user interface according to claim 1, further configured to maintain said graphical trace stationary before removing said portion of said graphical trace.

7. A device comprising a user interface according to claim 1.

8. A device according to claim 7, wherein said device is a mobile communications terminal or a laptop computer or a drawing pad or a personal digital assistant.

9. An apparatus comprising:
at least one processor,
at least one memory including computer program code,
the at least one memory and the computer program instructions configured to, with the processor, cause the apparatus at least to:
receive a stroke input;
cause a graphical trace of the stroke input to be displayed on a display;
in an instance in which an input speed of said received stroke input is below a threshold value, recognize the received stroke input as coded characters and cause at least a portion of the graphical trace to be removed from the display; and in an instance in which the input speed of said received stroke input is above the threshold value, cause the graphical trace to be stored in a memory of the user interface in a graphical form.

10. A method comprising:

receiving a stroke input;

causing a graphical trace of said stroke input to be displayed on a display;

in an instance in which an input speed of said received stroke input is below a threshold value, recognizing said received stroke input as coded characters and causing at least a portion of the graphical trace to be removed from the display; and in an instance in which the input speed of said received stroke input is above the threshold value, causing the graphical trace to be stored in a memory of the user interface in a graphical form.

11. A computer program product comprising at least one non-transitory computer-readable storage medium having computer-executable program code instructions stored therein, the computer-executable program code instructions comprising program code instructions for:

receiving stroke input;

causing a graphical trace of said stroke input to be displayed on a display;

in an instance in which an input speed of said received stroke input is below a threshold value, recognizing said received stroke input as coded characters and causing at least a portion of the graphical trace to be removed from the display; and in an instance in which the input speed of said received stroke input is above the threshold value, causing the graphical trace to be stored in a memory of the user interface in a graphical form.

12. The computer program product as in claim 11, the computer-executable program code instructions further comprising program code instructions for fading said portion or gradually removing said graphical trace before removing it.

* * * * *